(12) United States Patent
Camelotto

(10) Patent No.: US 12,527,259 B2
(45) Date of Patent: Jan. 20, 2026

(54) LONGITUDINAL SIEVE COMPENSATION

(71) Applicant: AGCO International GmbH, Neuhausen (CH)

(72) Inventor: Francesco Camelotto, Breganze (IT)

(73) Assignee: AGCO International GmbH, Neuhausen (CH)

( * ) Notice: Subject to any disclaimer, the term of this patent is extended or adjusted under 35 U.S.C. 154(b) by 891 days.

(21) Appl. No.: 17/755,451

(22) PCT Filed: Oct. 5, 2020

(86) PCT No.: PCT/IB2020/059337
§ 371 (c)(1),
(2) Date: Apr. 29, 2022

(87) PCT Pub. No.: WO2021/084349
PCT Pub. Date: May 6, 2021

(65) Prior Publication Data
US 2022/0386534 A1  Dec. 8, 2022

(30) Foreign Application Priority Data
Oct. 31, 2019 (GB) ..................................... 1915852

(51) Int. Cl.
*A01F 12/44* (2006.01)
*A01D 41/127* (2006.01)
*A01D 75/28* (2006.01)

(52) U.S. Cl.
CPC ........ *A01F 12/448* (2013.01); *A01D 41/1276* (2013.01); *A01D 75/282* (2013.01)

(58) Field of Classification Search
CPC .. A01F 12/448; A01D 41/1276; A01D 75/282
See application file for complete search history.

(56) References Cited

U.S. PATENT DOCUMENTS 6,978,570 B1 * 12/2005 Clark ..................... A01K 91/08
248/289.11
7,322,882 B2    1/2008 Duquesne et al.
(Continued)

FOREIGN PATENT DOCUMENTS

CN        105107720 A  * 12/2015
EP        2 936 967 A1    10/2015
(Continued)

OTHER PUBLICATIONS https://www.youtube.com/watch?v=OuhkhjPLwAs (Year: 2018).*
(Continued)

*Primary Examiner* — Joseph M Rocca
*Assistant Examiner* — Douglas J Meislahn

(57) ABSTRACT

A cleaning shoe for a combine harvester, including a frame, a sieve and at least one reciprocating mechanism attached to the sieve for reciprocating the sieve in a forwards and backwards motion and the reciprocating mechanism includes an eccentric drive housing, pivotably mounted to the frame, and arranged to rotate around a pivot point thus changing its angle to the horizontal, and an actuator connected to the eccentric drive housing, which varies the angle to the horizontal of the reciprocating motion of the sieve by varying the angle to the horizontal of the eccentric drive housing.

9 Claims, 7 Drawing Sheets

(56) References Cited

U.S. PATENT DOCUMENTS

| | | | |
|---|---|---|---|
| 8,651,927 | B1 | 2/2014 | Roberge et al. |
| 9,622,415 | B2 | 4/2017 | Duquesne et al. |
| 2005/0282601 | A1 | 12/2005 | Duquesne et al. |
| 2015/0305243 | A1 | 10/2015 | Duquesne et al. |
| 2015/0319931 | A1* | 11/2015 | Missotten ............... A01F 12/56 460/101 |
| 2016/0073587 | A1 | 3/2016 | Missotten et al. |
| 2017/0020071 | A1* | 1/2017 | Reinecke .............. A01F 12/446 |
| 2017/0196169 | A1 | 7/2017 | Duquesne et al. |
| 2018/0220584 | A1 | 8/2018 | Ricketts |
| 2019/0357441 | A1* | 11/2019 | Hillen ................... A01F 12/448 |
| 2019/0387682 | A1* | 12/2019 | Thomas ................ A01F 12/448 |

FOREIGN PATENT DOCUMENTS

| | | | |
|---|---|---|---|
| EP | 3498078 | A1 | 6/2019 |
| WO | 1994015450 | A1 | 7/1994 |

OTHER PUBLICATIONS

UK Intellectual Property Office, Search report for related UK Application No. GB1915852.6, dated Apr. 29, 2020.
European Patent Office, International Search Report related to International Patent Application No. PCT/IB2020/059337, mail date Dec. 15, 2020.

\* cited by examiner

LONGITUDINAL SIEVE COMPENSATION

FIELD OF INVENTION

The present invention relates to a grain sieve for a combine harvester. In particular, the invention relates to a means for compensating for the effects of a variance from the horizontal of a generally longitudinal axis of a combine harvester which is travelling in a generally uphill or downhill direction.

BACKGROUND OF INVENTION

Combine harvesters are commonly provided with a cleaning shoe, comprising a grain pan and at least one, usually two, grain sieves. The grain pan acts to initially catch grain and MOG falling from a threshing device, and is usually angled relative to the horizontal plane so that the grain and MOG moves down towards, and then falls off, one end of the pan. The grain and MOG then falls onto an upper sieve. The upper sieve is normally a generally flat structure with a frame and a series of adjustable parallel louvres arranged such that as the louvres open, the gaps between the louvres increases and the angle of the louvre relative to the plane of the sieve increases. The upper sieve is normally subjected to a generally linear longitudinal forward-and-backward (the terms 'forward' and 'backward' and 'front' and 'rear' and so on being used here as generally relative to a forwards moving direction of the combine harvester when in use) reciprocating motion, and the louvres are angled so that the grain and MOG is generally 'ratcheted' towards the rear end of the upper sieve, with grain dropping through the gaps. Normally there is a second lower sieve below the upper sieve, which may operate in much the same way or which may be simpler. The upper sieve may be disposed within the combine harvester to be generally aligned with the horizontal plane, or may be disposed to be longitudinally at a slight angle to the horizontal plane, such that, for example, the rear end of the sieve is higher up than the front end.

The motion of the sieve may be longitudinal along the plane of the sieve itself, or may be generally reciprocal along a vector at an angle to the plane of the sieve, depending on how the sieve is mounted.

Whilst the motion of the sieve is described as generally linear, various existing reciprocating mechanisms give a curvilinear path, and it is understood that this is encompassed by use of the phrase 'generally linear'.

There is also normally provided a fan which blows air up and backwards through the louvres of the upper sieve. In some versions, more sophisticated air movement is provided by compressed air blown through holes in the sieve itself (U.S. Pat. No. 8,651,927 refers), but the intent is the same. Accordingly, chaff and other light MOG is blown out the back of the combine, whilst the heavier grains fall through; and larger MOG is unable to fall through the gaps provided by the louvres. In this way the sieve sifts the grain from the MOG.

An issue with cleaning shoes in general, and sieves in particular, is that they are designed to work at an optimum design point when the combine harvester is 'on the flat' and a generally longitudinal axis of the combine is essentially horizontal. However, many combine harvesters work on land that is not flat, and consequently the combine, the cleaning shoe and the sieves may be subject to lateral or longitudinal angle variations from their normal working plane.

Various solutions have been presented for this problem. A standard method is to adjust the opening of the louvres to compensate for the angle of the sieve.

Some combine harvesters are available with suspension systems which are capable of tilting the entire vehicle both laterally and longitudinally. This is expensive and adds weight to the machine. The angles that can be achieved are also limited by practicality or the necessity to tilt other parts of the machine to compensate for the tilt of the main part of the machine, ie: the header or the driver cabin.

A number of patents have been published detailing methods of modifying the longitudinal reciprocal motion of the sieve so as to include a lateral component to the motion, to compensate for lateral inclination of the sieve (ie: U.S. Pat. No. 7,322,882). These do not provide a solution to longitudinal changes of angle, however.

Other patents have been published such as WO1994015450A1 which provide a mechanism for tilting the sieve in a lateral direction, or alternatively the entire cleaning shoe. Such tilting is a complex mechanical problem which relies on having sufficient space within the machine to fit the necessary required components. As combine harvester machines are required to process ever more crop and yet not exceed certain overall dimensions, such space is at a premium.

One routine mechanism involves varying the speed of airflow from the fan which blows air up and through the sieve, as the combine harvester climbs up or drops down a slope. The disadvantage is that too much airflow can start to blow grains away and/or prevent their passage through the sieve, or that too little airflow can result in an excess of MOG falling through the sieve.

A new solution is required for dealing with the effects of a longitudinal tilt of a combine harvester (and thus the variation from the ideal longitudinal design angle of the sieve) on a sieve.

SUMMARY OF INVENTION

According to a first aspect of the present invention, there is provided a cleaning shoe for a combine harvester, comprising:
  a frame;
  a sieve;
  at least one reciprocating mechanism attached to the sieve for reciprocating the sieve in a generally forwards and backwards motion;
  characterised in that the reciprocating mechanism comprises:
    an eccentric drive housing, pivotably mounted to the frame, said eccentric drive housing arranged so as to rotate around a pivot point so as to operably change its angle to the horizontal,
    and an actuator connected to the eccentric drive housing, wherein the actuator is operable to vary the angle to the horizontal of the reciprocating motion of the sieve by varying the angle to the horizontal of the eccentric drive housing.

The advantage of the present invention is delivered by the ability of the sieve to oscillate/reciprocate at an angle that can be varied, wherein the angle can be varied to cater for field inclines. Loss through working on inclines is thus reduced without the need to change the angle of the combine or the sieves.

Preferably, the eccentric drive housing comprises an elongate member having an aperture with toothing around its inner circumference for engagement with a gear having toothing around its outer circumference.

The eccentric drive housing may have a boss which allows for engagement with a bearing. Preferably the boss is substantially cylindrical.

The reciprocating mechanism may further comprise a gear having an offset pin which can engage with a slot in a back cover which is attached to the back of the eccentric drive housing.

The one end of the elongate member of the eccentric drive housing may be pivotably connected to a linkage to a second reciprocating mechanism.

The other end of the elongate member may be pivotably connected to an actuator.

The actuator may be a hydraulic or pneumatic cylinder or an electromechanical servo unit or any other suitable actuator readily known by or available to a skilled person.

The reciprocating mechanism may further comprise a drive pulley which is connected to a pulley support. The drive pulley may be mounted on a bearing which engages with the boss of the eccentric drive housing.

The drive pulley may have an eccentric pin which can engage with a collar which can fit into the aperture of the gear.

In an embodiment, the second reciprocating mechanism is attached to the opposite end of the sieve to the first reciprocating mechanism. The second reciprocating mechanism operably varies the height of the sieve.

The second reciprocating mechanism may have an eccentric drive housing connected by a linkage to the eccentric drive housing of the first reciprocating mechanism. The second reciprocating mechanism may be connected via the linkage to the first reciprocating mechanism so that movement of the sieve is synchronised.

Preferably, the actuator operates the first reciprocating means and the linkage operates the second reciprocating mechanism.

Preferably, the linkage to the second reciprocating mechanism controls the second reciprocating mechanism to adjust the height of the far end of the sieve at which the second reciprocating mechanism is attached to.

Preferably, the second reciprocating mechanism lowers the end of the sieve where the second reciprocating mechanism is attached to, as the other end of the sieve where the first reciprocating mechanism is attached to rises.

Preferably, the second reciprocating mechanism raises the end of the sieve where the second reciprocating mechanism is attached to, as the other end of the sieve where the first reciprocating mechanism is attached to lowers.

BRIEF DESCRIPTION OF THE DRAWINGS

The invention will now be described, by way of example only, with reference to the accompanying drawings, in which.

SPECIFIC DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine 10 and indicated by arrow F. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference of the general direction of crop flow along the material conveyance systems described.

Figure 1:
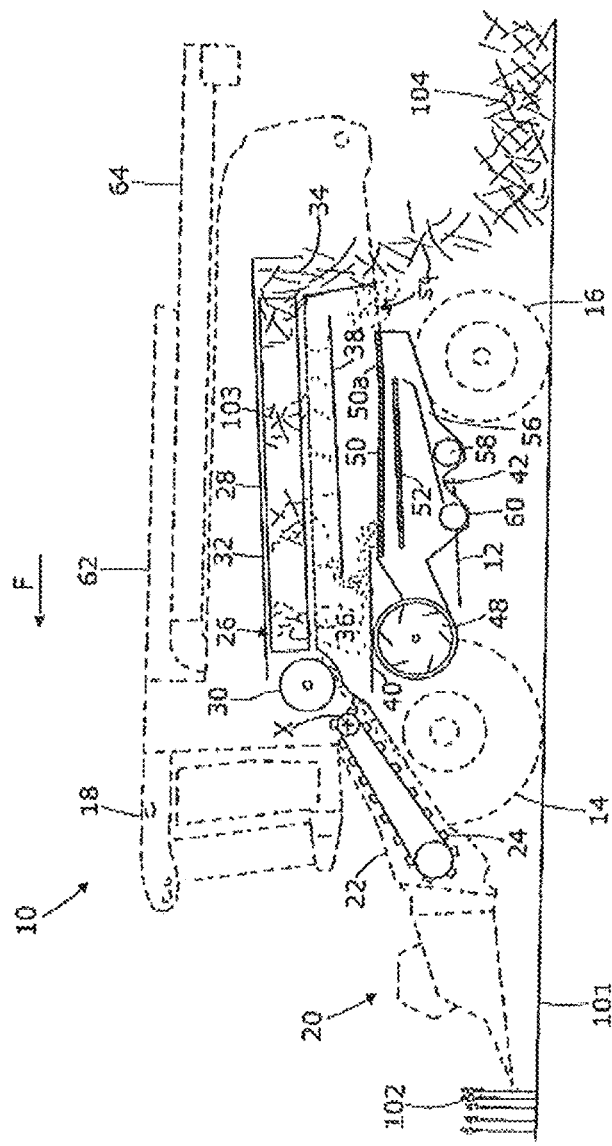
FIG. 1 shows a side view of a known combine harvester revealing, in schematic form, a grain cleaning system.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, normally in the form of a chain and slat elevator as shown, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging vanes (not shown) which convey the crop material stream under the beater and into rotor housings 32 which each house one of said rotors 28. It should be appreciated that only the lefthand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

Axial flow rotors 20 serves to thresh the crop stream in a front region, separate the grain therefrom in a rear region, and eject the straw residue via a straw discharge chute 34 provided below a rear portion of the rotors 20, the straw falling either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 36 is typically a mix of grain and material other than grain (MOG) which may include chaff, tailings and some straw.

The return pan 38 and stratification pan 40 together serve as a material conveyance system arranged to convey the separated crop material to a grain cleaning shoe designated generally at 42. The pans 38, 40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at shoe outlet 54. A rear section of chaffer 50a is commonly independently adjustable and is configurable to allow un-threshed tailings to pass there through into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling there through is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

An aspect of the invention relates to the cleaning shoe 42 and in particular to the variation of the angle of the sieves (50, 52) to cater for field inclines.

Figure 2:
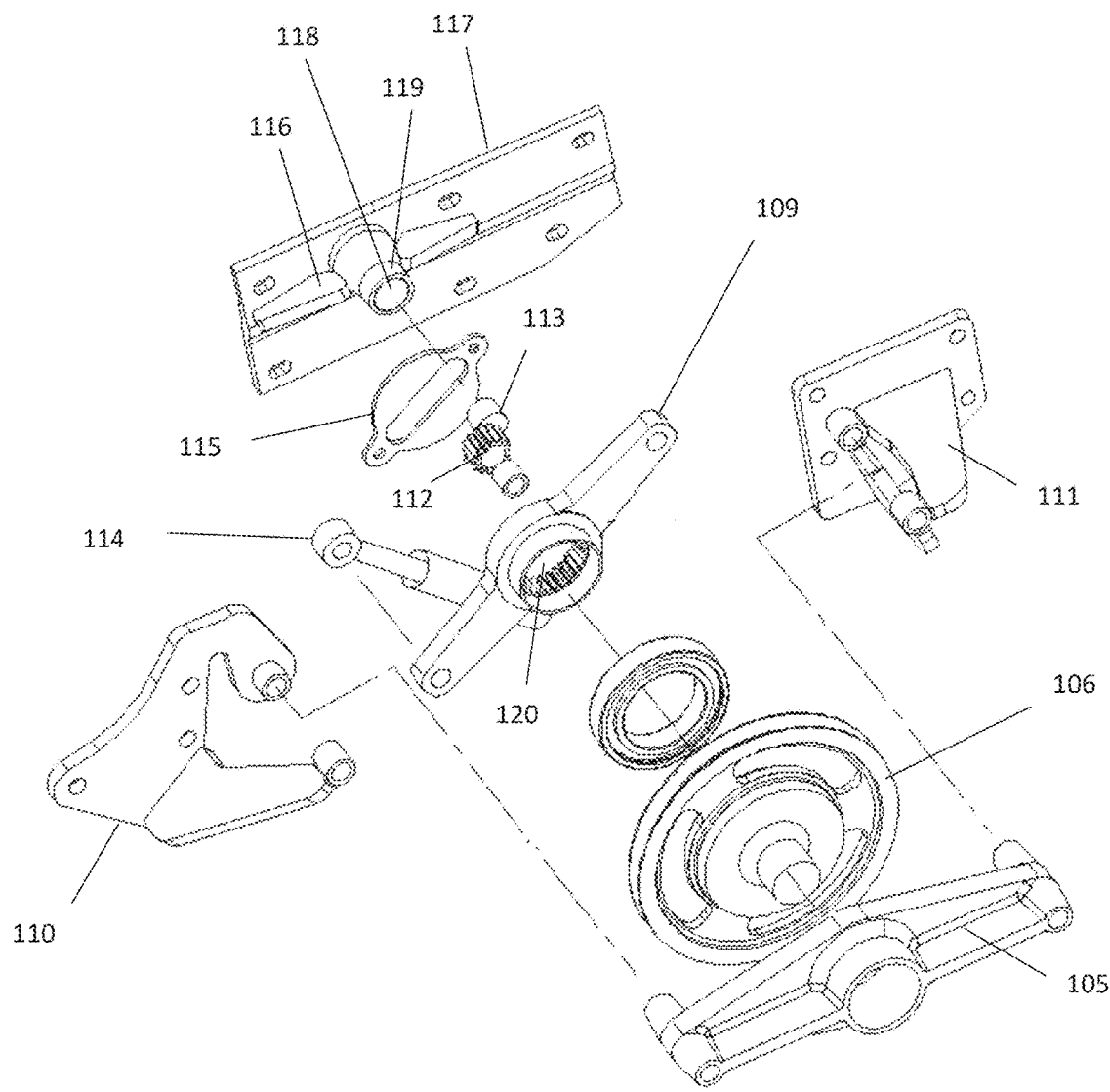
FIG. 2 shows an exploded view of various components of the reciprocating mechanism.
Figure 3:
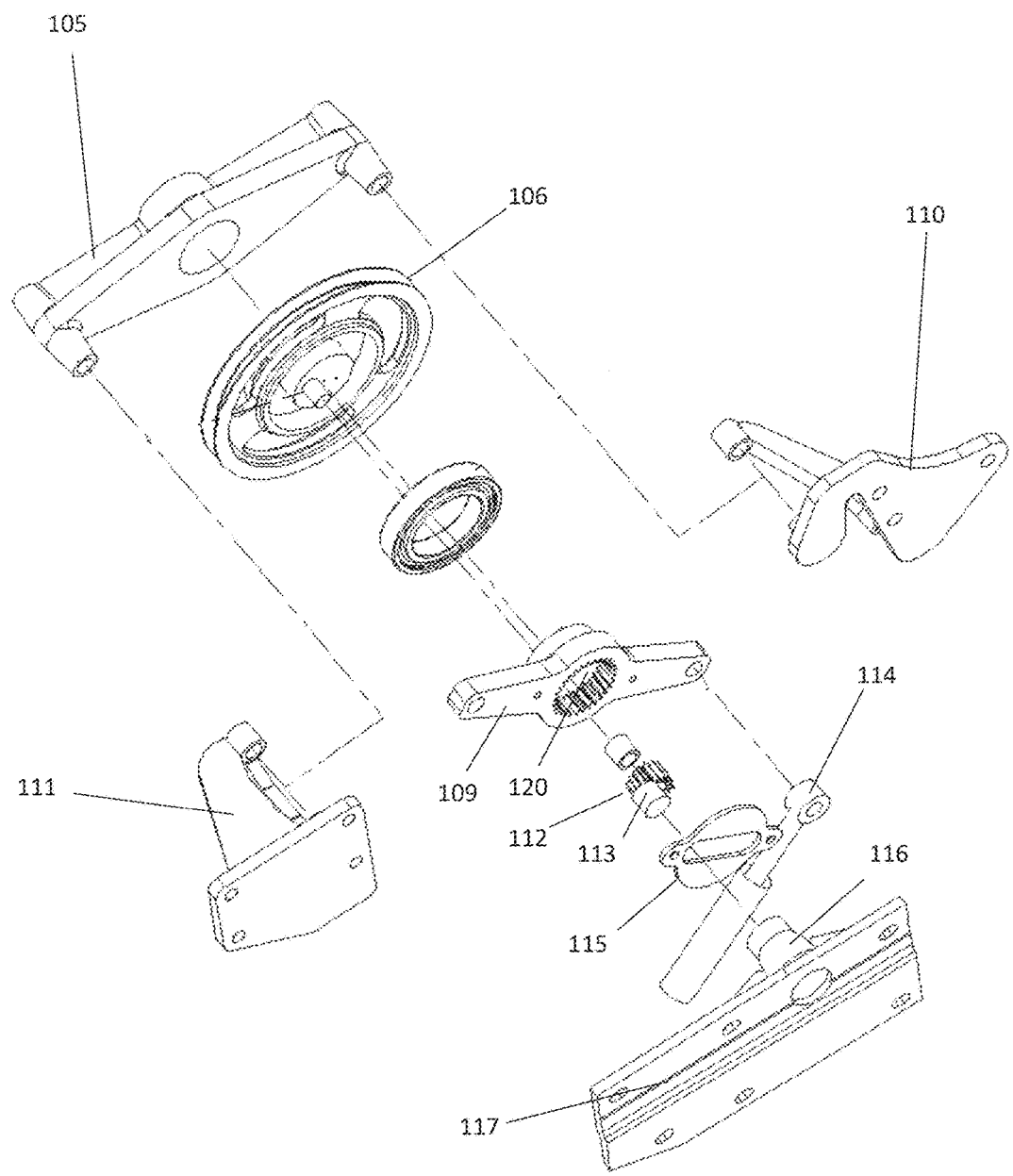
FIG. 3 shows an exploded view of various components of the reciprocating mechanism.

FIGS. 2 and 3 show exploded views of the various components of the reciprocating mechanism according to an embodiment of the invention. For the avoidance of doubt, the sieves are not shown.

A support 116 is mounted onto the sieve frame 117 with the support having an inner aperture 118 and a boss 119 which can engage with an offset pin 113 on a gear 112.

The offset pin 113 is able to slide along a slot located inside a back cover 115 attached to the back of an eccentric drive housing 109. The movement of the offset pin along the slot results in a reciprocating movement of the sieve.

The gear 112 having an offset pin 113 has toothing around its outer circumference so as to engage with the toothing on the inner circumference of an aperture 120 of an eccentric drive housing 109.

The gear 112 is rotated around the inner circumference of the aperture 120 by a drive pulley 106 which is connected to a pulley support 105.

This rotation of the gear 112 operably slides the offset pin 113 along the slot of the back cover 115 which in turn moves the sieve in a reciprocating movement.

The eccentric drive housing 109 comprises an elongate member with one end having an actuator 114 pivotably connected thereto and the other end being connected to a linkage to a second reciprocating mechanism.

By varying the length of the actuator 114, the actuator is operable to vary the angle to the horizontal of the reciprocating motion of the sieve by varying the angle to the horizontal of the eccentric drive housing 109.

By turning the eccentric drive housing 109 around its centre by the extension or retraction of the actuator 114, the angle of the slot in the back cover 115 is varied accordingly which subsequently results in the angle of the sieve being varied.

The extension of the actuator 114 operably varies the angle of the slot of the back cover 115 resulting in the sieve being raised at the end where the first reciprocating mechanism is pivotably attached to the sieve frame 117.

The retraction of the actuator 114 operably varies the angle of the slot of the back cover 115 resulting in the sieve being lowered at the end where the first reciprocating mechanism is pivotably attached to the sieve frame 117.

Figure 4:
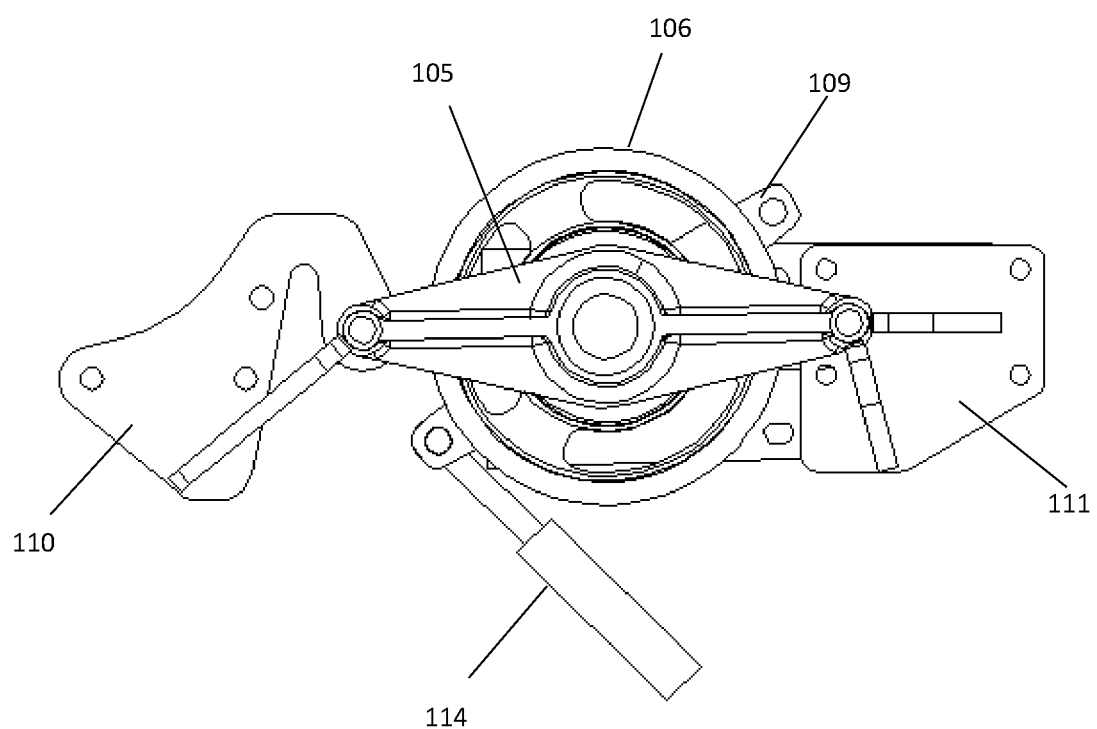
FIG. 4 shows an end view of the reciprocating mechanism. For the avoidance of doubt, the sieves are not shown.

FIG. 4 shows an end view of the reciprocating mechanism. For the avoidance of doubt, the sieves are not shown. A first frame bracket 110 and a second frame bracket 111 support the reciprocating mechanism onto the sieve frame 117.

Figure 5:
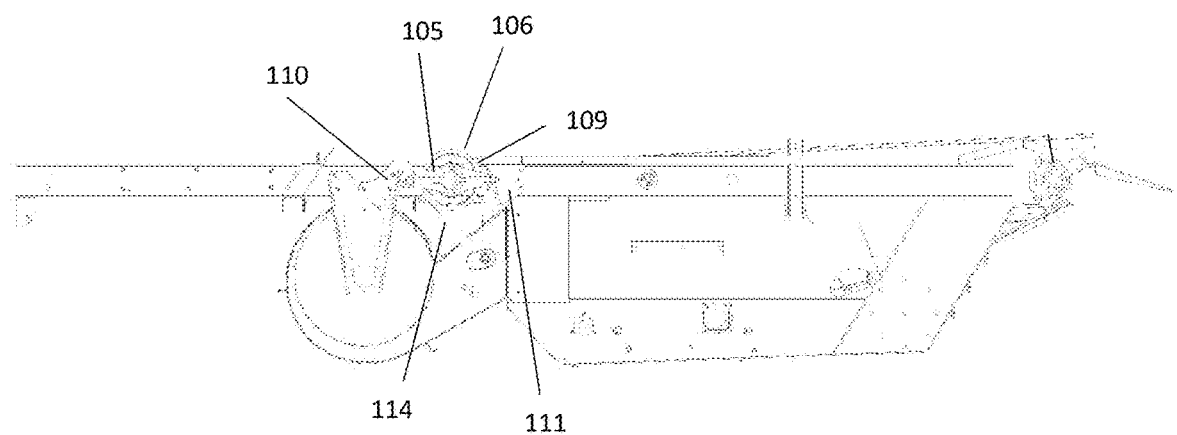
FIG. 5 shows an end view of the reciprocating mechanism mounted onto the sieve frame.
Figure 6:
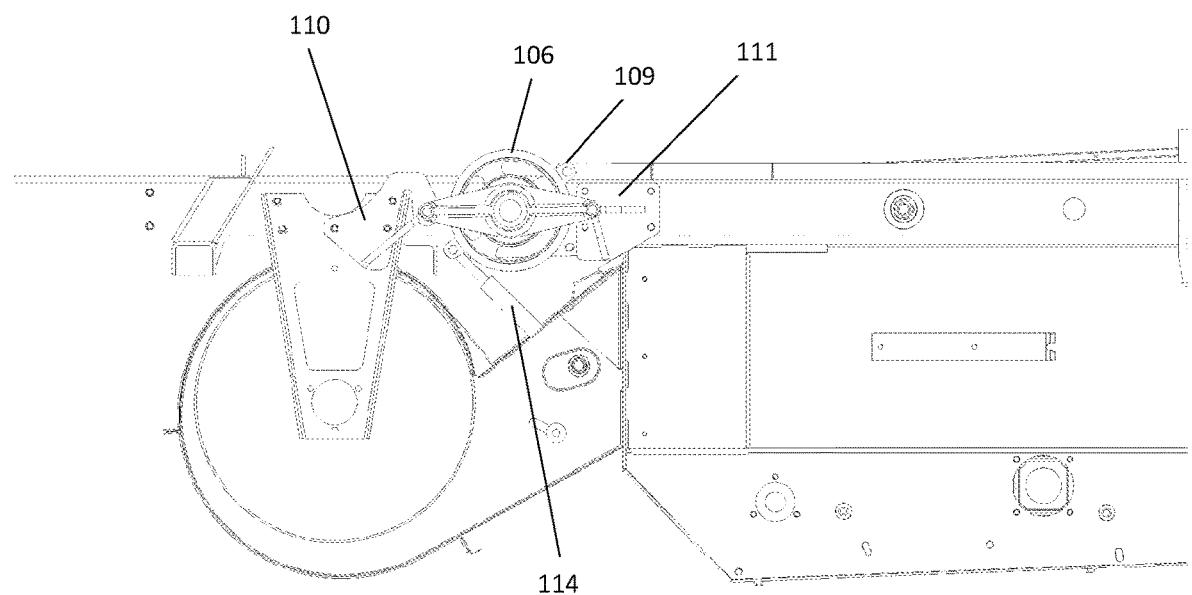
FIG. 6 shows a partial cutaway view of the reciprocating mechanism mounted onto the sieve frame.
Figure 7:
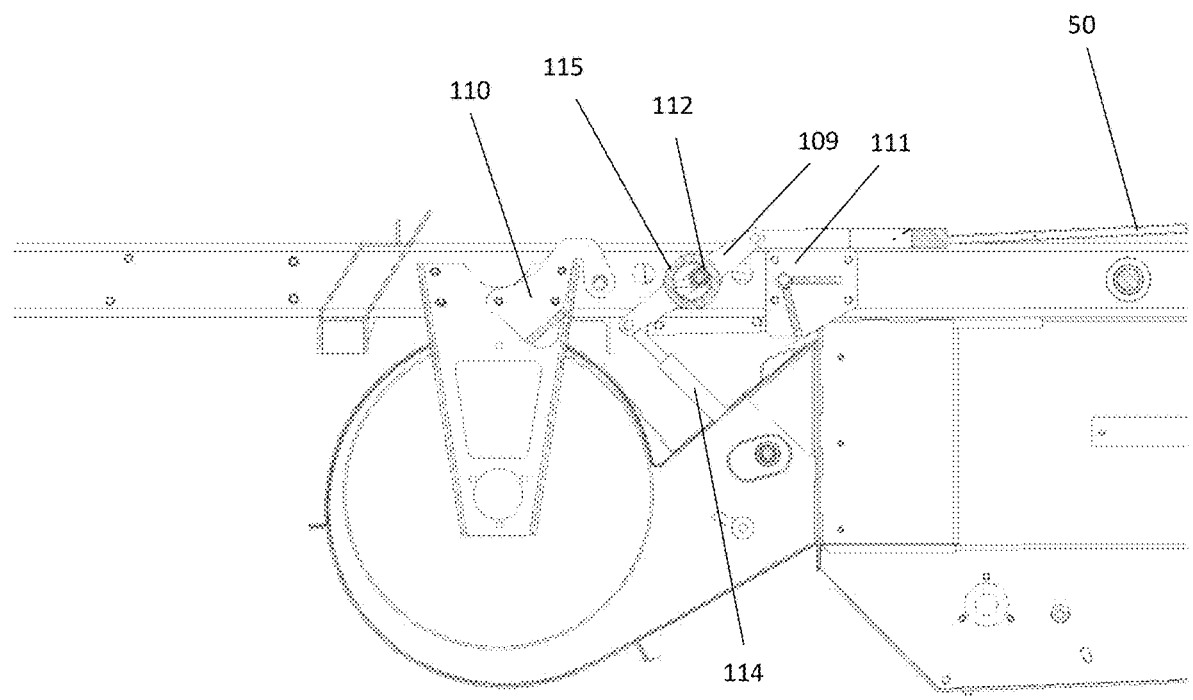
FIG. 7 shows a partial cutaway view of the reciprocating mechanism mounted onto the sieve frame.

FIGS. 5 to 7 show how the reciprocating mechanism is installed on the sieve frame with FIGS. 6 to 7 showing partial cutaway views of the reciprocating mechanism.

FIG. 5 shows how a second reciprocating mechanism is attached to the opposite end of the sieve to the first reciprocating mechanism. A linkage connects the first and second reciprocating mechanism so that movement of the sieve can be synchronised. In operation, when the sieve is raised at the end where the first reciprocating mechanism is installed, the opposite end of the sieve where the second reciprocating mechanism is installed can be lowered. Alternatively, when the sieve is lowered at the end where the first reciprocating mechanism is installed, the opposite end of the sieve where the second reciprocating mechanism can be raised. This enables the sieve to reciprocate at an angle that can be varied, wherein the angle can be varied to cater for field inclines. Loss through working on inclines is thus reduced without the need to change the angle of the combine or the sieves.

In summary there is disclosed a cleaning shoe for a combine harvester, comprising a frame, a sieve; at least one reciprocating mechanism attached to the sieve for reciprocating the sieve in a generally forwards and backwards motion; characterised in that the reciprocating mechanism comprises an eccentric drive housing, pivotably mounted to the frame, said eccentric drive housing arranged so as to rotate around a pivot point so as to operably change its angle to the horizontal, and an actuator connected to the eccentric drive housing. The actuator is operable to vary the angle to the horizontal of the reciprocating motion of the sieve by varying the angle to the horizontal of the eccentric drive housing.

Clearly the skilled person will recognise that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A cleaning shoe for a combine harvester, comprising:
   a frame;
   a sieve;
   at least one reciprocating mechanism attached to the sieve for reciprocating the sieve in a generally forwards and backwards motion, the reciprocating mechanism comprising:
      an eccentric drive housing, pivotably mounted to the frame, said eccentric drive housing arranged so as to rotate around a pivot point and to operably change an angle of the housing to horizontal;
      a support mounted onto the frame comprising an inner aperture and a boss;
      a gear having toothing around an outer circumference, the toothing configured to engage with toothing on an inner circumference of an aperture of the eccentric drive housing, wherein an offset pin is provided on the gear, the boss engages with the offset pin;
      a back cover on the eccentric drive housing comprising a slot, wherein the offset pin is configured to slide along the slot in a reciprocating motion; and
      an actuator connected to the eccentric drive housing, wherein the actuator is operable to rotate the eccentric drive housing so as to vary an angle to horizontal of the slot in which the offset pin is configured to slide in order to vary the angle to the horizontal of the reciprocating motion of the sieve.

2. The cleaning shoe of claim 1, comprising a plurality of the reciprocating mechanisms.

3. The cleaning shoe of claim 1, wherein the eccentric drive housing comprises an elongate member with one end having an actuator pivotably connected thereto and the other end connected to a linkage to a second reciprocating mechanism.

4. The cleaning shoe of claim 1, wherein the actuator is a hydraulic or pneumatic cylinder or an electromechanical servo.

5. The cleaning shoe of claim 1, wherein the reciprocating mechanism further comprises a drive pulley which is connected to a pulley support.

6. The cleaning shoe of claim 1, wherein the gear is rotated around the inner circumference of the aperture of the eccentric drive housing by a drive pulley.

7. The cleaning shoe of claim 1, wherein the reciprocating mechanism further comprises a first frame bracket and a second frame bracket to support the reciprocating mechanism onto the sieve frame.

8. The cleaning shoe of claim 1, further comprising a second reciprocating mechanism attached to an opposite end of the sieve attached to a first reciprocating mechanism.

9. The cleaning shoe of claim 8, wherein the second reciprocating mechanism comprises an eccentric drive housing which is connected by a linkage to the eccentric drive housing of the first reciprocating mechanism.

* * * * *